L. P. WHITAKER.
MECHANISM FOR GRIPPING AND CARRYING GRAIN STALKS.
APPLICATION FILED MAY 8, 1915.
1,163,729.
Patented Dec. 14, 1915.
2 SHEETS—SHEET 1.
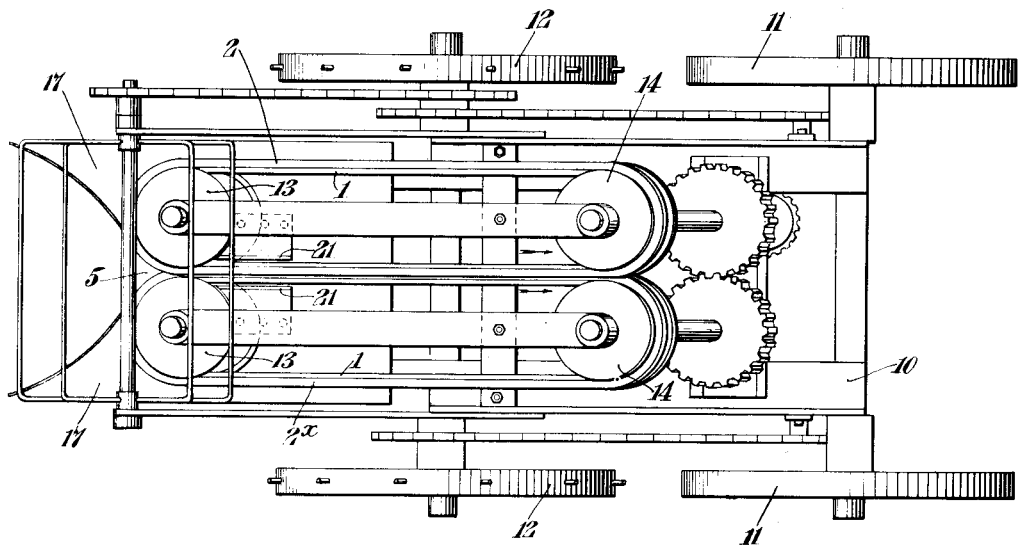
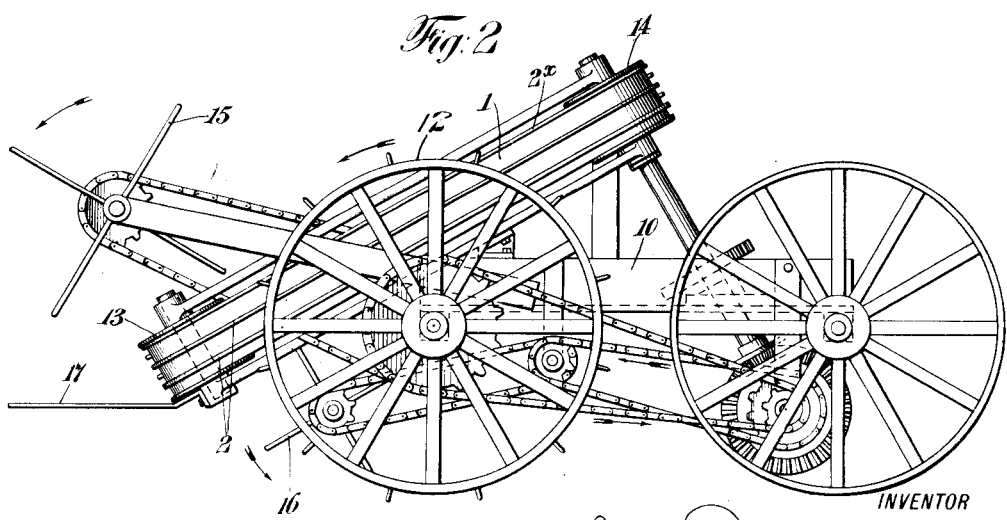
INVENTOR L. P. WHITAKER.
MECHANISM FOR GRIPPING AND CARRYING GRAIN STALKS.
APPLICATION FILED MAY 8, 1915.
1,163,729.
Patented Dec. 14, 1915.
2 SHEETS—SHEET 2.
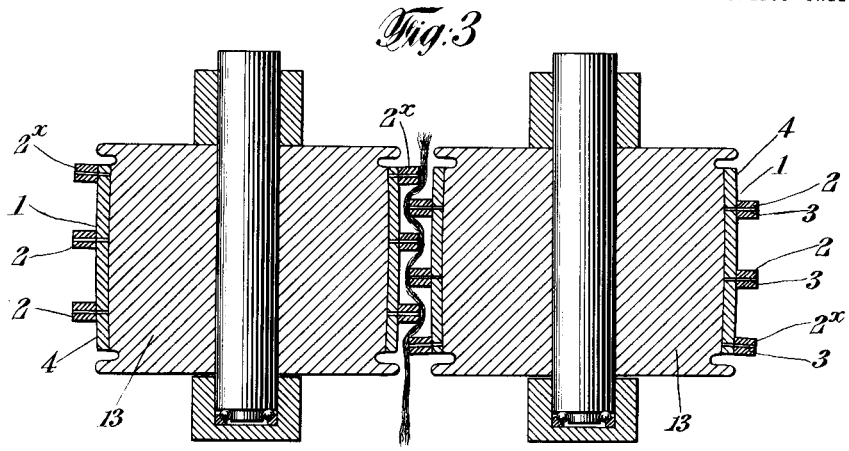
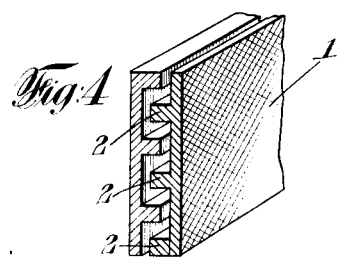
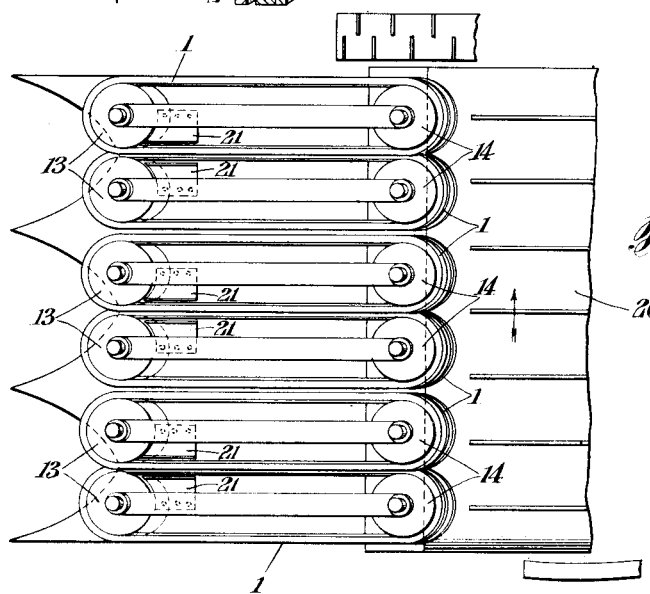
INVENTOR
Louis P. Whitaker

UNITED STATES PATENT OFFICE.

LOUIS PREVOST WHITAKER, OF NEW YORK, N. Y., ASSIGNOR OF ONE-HALF TO VICTOR E. FREEMAN, OF NEW YORK, N. Y.

MECHANISM FOR GRIPPING AND CARRYING GRAIN-STALKS.

1,163,729. Specification of Letters Patent. Patented Dec. 14, 1915.

Application filed May 8, 1915. Serial No. 26,713.

*To all whom it may concern:*

Be it known that I, Louis P. Whitaker, a citizen of the United States, residing at New York, in the county of New York and State of New York, have invented certain new and useful Improvements in Mechanism for Gripping and Carrying Grain-Stalks; and I do hereby declare the following to be a full, clear, and exact description of the invention, such as will enable others skilled in the art to which is appertains to make and use the same.

My invention consists in the novel features hereinafter described, reference being had to the accompanying drawings which illustrate one form in which I have contemplated embodying the invention, and the said invention is fully disclosed in the following description and claims.

Referring to the said drawings, Figure 1 represents a top plan view of a single unit apparatus for pulling flax, embodying my present invention. Fig. 2 is a side elevation of the same. Fig. 3 is an enlarged sectional view through the opposed rollers of one pulling unit located at one end of the same, and showing the pulling belts in section. Fig. 4 is a detail sectional view showing a slightly modified form of pulling belt. Fig. 5 is a partial top plan view of a flax pulling machine illustrating three of the units similar to those shown in Figs. 1, 2, and 3, arranged side by side.

In the harvesting of the flax plant for the purpose of securing the fiber from the stalks, it is desirable to pull them from the ground together with the roots of the plants instead of severing the stalks at a greater or less distance from the ground, as is the custom in harvesting other grains, and as is customary in harvesting flax where the product sought is the flax seed and not the fiber. Obviously, one reason for pulling flax for fiber production is that a greater length of fiber is obtained by harvesting the entire plant including the roots, but aside from this, the subsequent handling of the plant in the production of fiber is facilitated where the plants are not severed and as a matter of fact, the soil is left in better condition for another or other crops if the roots of the flax plants are eliminated entirely therefrom instead of being permitted to rot in the ground. Ordinarily, in harvesting flax for the production of fiber therefrom, it is pulled by hand, but this method is slow, tedious, and painful, so that it is difficult, if not impossible, to employ it commercially in the United States, as labor is better paid for less exacting forms of effort. Flax is ordinarily sowed broadcast, and the plants grow very close together like the cereal plants and without any uniformity of distribuation. The stalk is really a slender straw having a smooth, hard exterior surface, and a successful device for pulling flax must be capable of grasping one or any number of these slender straws so firmly that they cannot slip lengthwise and without breaking or bruising the stalks, or the fiber contained therein.

In carrying out my invention, I employ a pulling unit which consists of a pair of endless belts of considerable transverse width, each supported upon two rollers having vertically disposed axes, and in such manner that a portion of each belt extending from one roller to the other, lies parallel with and opposed to a corresponding portion of the other belt. The exterior face of each belt is provided with one or more longitudinally extending ribs co-extensive with the belts and disposed at intervals transversely of the belts, the continuous longitudinal ribs of one belt being so located that they will lie between, or intermesh with, the corresponding ribs of the other belt throughout the parallel opposed portions of the two belts, constituting the pulling unit. I prefer to have the longitudinal ribs of each belt spaced a greater distance apart than the width of the opposing belt so that the opposing ribs of the respective belts do not necessarily come into contact with each other, but lie between and alternate with the ribs of the opposed belt, something in the manner of the intermeshing relation between the teeth of gear wheels when not under strain, and it is not necessary that the longitudinal ribs of one belt should touch the exterior face of the other belt between the ribs thereof. The pulling unit thus formed is disposed at an angle to the surface of the ground, the front end being lower than the rear end, and power is applied to one of the rollers engaging each belt of the unit in such manner as to cause the parallel portions to move in unison from front to rear and upwardly, while the unit itself is mounted upon a suitable frame-work or machine frame, so that it can be propelled forwardly over the ground at approximately the same or slightly less speed than the rearward movement of the parallel portions of the belt. The stalks of flax in front of the pulling unit are gathered by means of suitable converging guides and deflected to a point between the two leading rollers of the unit and are drawn between the opposed parallel portions of the belts, which, by reason of the longitudinal ribs before described, deflect each and every straw or stalk whether one or more, into a zig zag form, as indicated, for example, in Fig. 3, placing a sufficient number of bends therein, so as to prevent the stalks from slipping endwise with respect to the belts, and as the stalks are carried rearwardly at approximately the same speed as the pulling unit itself is bodily advanced, the ribs of the stalks are drawn out of the ground and the stalks, together with the ribs, are delivered at the rear of the pulling unit and disposed of in any desired way. According to my invention, there is no clamping of the stalks as that term is generally understood, but as before stated, a sufficient number of bends are made in the plant to frictionally hold it firmly against longitudinal movement, and as a matter of fact, these pulling belts will clamp the stalks so firmly that they will pull the roots out of the ground under any conditions and at the same time will not bruise or break or injure the plant.

The pulling belts are preferably made of material which is flexible enough to bend around the pulleys, but which is practically rigid under strain transversely of its length, in a plane parallel to its inner and outer faces, in other words, edgewise. For example, I may use leather belting of sufficient thickness to give it the required rigidity edgewise and the longitudinal ribs may also be made of leather or other flexible material and secured to the exterior face of the belt throughout its entire extent or be formed substantially integrally therewith, so that they will be co-extensive with the belt and of sufficient flexibility to bend around the pulleys with the belt. As these pulling units are more or less exposed to moisture from the elements and moisture adhering to the plants under certain conditions, I prefer to form the belts of heavy woven or other fabric, such for example, as is used for belting purposes approximately one quarter of an inch or more in thickness, and woven in such a manner as to give it the edgewise stiffness and strength before referred to, while the material at the same time is sufficiently flexible to bend around a pulley even of comparatively small diameter. This woven or other fabric is of such character and is so treated with waterproofing material, that it is practically non-stretchable, and unaffected by either heat or moisture. Material of this kind is now on the market and is ordinarily used for belting. In forming the pulling belts, I form the belt proper, indicated at 1 in Figs. 1, 2, and 3, of this material and upon the exterior thereof, I attach a plurality of the co-extensive longitudinal ribs 2 and 2$^x$, which are preferably formed of the same material or fabric, and may be made separately and secured thereto by stitching with thread or wire 3, in Fig. 3, or the said longitudinal ribs may be formed or made up integrally with the structure of the main body 1 of the belt, as indicated in Fig. 4. I also prefer to locate one of the ribs closely adjacent to one of the longitudinal edges of each belt and to provide a plane surface, indicated at 4, adjacent to the opposite edge. By this means I can form the two belts of the pulling unit from the same stock, by reversing the position of one of the belts so that the plane edge portion of each belt is opposite to the marginal rib, which I have indicated at 2$^x$, of the other, and this avoids the necessity of making the belts of a unit each specially, which would otherwise be the case, as for example, where one belt was provided with two ribs, and the other with three to intermesh therewith, or where the belts were provided respectively with three and four or four and five ribs, etc.

It will be seen that as the ribs 2, 2$^x$ are co-extensive with the belt, every portion of each belt is effective as soon as it comes into opposition to the other belt of its pulling unit, and that the recess, indicated at 5 in Fig. 1, in advance of and between the front pair of rollers of the unit, and the portions of the belts surrounding the same, is always in operative position to receive and seize the stalks, while the texture of the surface of these flexible belts and continuous flexible ribs, whether of leather or other kinds of fabric herein described, is of such character as to assist in frictionally holding them by reason of the genuflexions produced by the opposed and intermeshing ribs.

In Figs. 1 and 2 of the drawings, I have shown a simple apparatus provided with a single pulling unit of the character which has just been described, and comprising a supporting frame 10, mounted in this instance upon four wheels 11—11 and 12—12, and carrying two pairs of supporting rollers or drums 13—14, each pair of which is engaged by one of the pulling belts 1 before described, having thereon the longitudinal co-extensive flexible ribs 2. In this instance the rear rollers 14—14 are driven by means of suitable gearing operatively connected with the traction wheels 12—12 which also drive a suitable reel 15 supported from the main frame 10, in advance of the front end of the pulling unit, and also a beater 16 supported below the pulling unit to knock off the dirt which may adhere to the roots of the plant, but these features form no part of my present invention and need not be more particularly described, as my present invention relates particularly to the construction of the pulling belts. Guides or guards 17 are also provided in front of the machine to direct the stalks into the bite of the pulling belts at the point indicated at 5, so as to gather the stalks growing over a strip of suitable width and direct them between the opposing portions of the belts.

Obviously a plurality of these pulling units may be arranged upon a machine so as to simultaneously pull the flax growing on a stretch of considerable width, 2, 3, 4, 5, or more of these units being mounted alongside of each other, as clearly illustrated, for example, in Fig. 5, in which 1 have indicated a portion of a plan view of a flax harvesting machine showing three pulling units arranged side by side and arranged to deposit the pulled flax upon a transversely moving apron 20 in rear thereof, similar to the horizontal conveyer or receiving apron of an ordinary harvester.

In connection with the opposing portions of the belts of each pulling unit, I prefer to provide means for holding the belts with their projecting ribs in operative relation, and for this purpose I have shown in the case of the single unit machine in Fig. 1, and in the multiple unit machine Fig. 5, vertically disposed guide plates 21—21 disposed in rear of and parallel to the inner faces of the opposed portions of the belts, and extending longitudinally thereof, for a short distance, rearwardly from the front rollers 13 and 14. While I do not regard these guide plates as essential to the successful operation of the pulling units, they will prevent the belts from being pushed away from each other in case a very large number of stalks are drawn into the belts at one point, and will insure in such case, the proper deflection of the stalks out of a straight line to afford the necessary frictional grasp thereof. As a matter of fact, I prefer to have these guide plates so located that they do not quite come in contact with the inner faces of the belts when no stalks are between the same, so that they do not retard the movement of the belts, although they may be adjusted into contact with the inner faces of the belts, if desired.

Owing to the peculiar formation of the root of the flax plant, most of the force required to dislodge the root is exerted at a point very close to the front rollers 13—13 and when the roots are once started, they are very readily withdrawn from the earth, and I do not ordinarily find it necessary to provide any retaining means for holding the opposed portions of the belts together throughout a greater part of such opposed portions, as the belts are then merely carrying the weight of the detached plants, which is practically nothing. I prefer to keep the belts at all times very tightly stretched between the rollers 13 and 14, by any suitable means, and I find in practice that the belts constructed as hereinbefore described, are effective without auxiliary means for holding them together. Obviously the guide plates 21—21 could be extended rearwardly a greater or less length, as desired.

What I claim and desire to secure by Letters Patent is:—

1. Mechanism for gripping and carrying grain stalks, comprising a pair of endless belts arranged side by side so that a portion of one belt is parallel and opposed to a portion of the other belt at all times, each of said belts comprising a broad band of flexible material provided with a plurality of longitudinal ribs projecting from its exterior surface, said ribs being co-extensive longitudinally with the belt, and the ribs of one belt being out of alinement transversely with and intermeshing with those of the other belt, throughout the parallel opposed portions of said belts, and means for driving said belts so as to cause the parallel opposed portions to move in the same direction and at the same speed.

2. Mechanism for gripping and carrying grain stalks, comprising a pair of endless belts arranged side by side so that a portion of one belt is parallel and opposed to a portion of the other belt at all times, each of said belts comprising a broad band of material substantially inflexible in directions parallel to the planes of its inner and outer faces, but flexible in directions transversely of said planes, and provided with a plurality of longitudinally disposed and longitudinally co-extensive ribs projecting from the exterior face, the ribs of one belt being out of alinement transversely with and intermeshing with those of the other belt, throughout the parallel opposed portions, and means for driving said belts so as to cause the opposed parallel portions thereof to move in the same direction and at the same speed.

3. Mechanism for gripping and carrying grain stalks, comprising a pair of endless belts arranged side by side so that a portion of one belt is parallel and opposed to a portion of the other belt at all times, each of said belts comprising a broad band of flexible material provided with a plurality of longitudinal ribs projecting from its exterior surface, said ribs being co-extensive longitudinally with the belt, and the ribs of one belt being out of alinement transversely with and intermeshing with those of the other belt, throughout the parallel opposed portions of said belts, one of said ribs being located adjacent to one of the longitudinal margins of the belt and the opposite marginal portion of the belt extending a distance beyond the adjacent rib, and being opposed to the marginal rib of the other belt, and means for driving said belts so that the parallel opposed portions thereof will move in the same direction and at the same speed.

4. Mechanism for gripping and carrying grain stalks, comprising a pair of endless belts arranged side by side so that a portion of one belt is parallel and opposed to a portion of the other belt at all times, each of said belts comprising a broad band of flexible material provided with a plurality of longitudinal ribs projecting from its exterior surface, said ribs being co-extensive longitudinally with the belt, and the ribs of one belt being out of alinement transversely with and intermeshing with those of the other belt, throughout the parallel opposed portions of said belts, guiding devices supported adjacent to the inner faces of the parallel opposed portions of said belts, but out of contact therewith, for preventing the undue separation of said opposed portions, and means for driving said belts so that the parallel opposed portions thereof will move in the same direction and at the same speed.

5. Mechanism for gripping and carrying grain stalks, comprising a pair of endless belts arranged side by side so that a portion of one belt is parallel and opposed to a portion of the other belt at all times, each of said belts comprising a broad band of woven fabric substantially rigid in directions parallel to the planes of its inner and outer faces, but flexible in directions perpendicular thereto, and longitudinally co-extensive continuous ribs of flexible material, the ribs of one belt being out of alinement with and intermeshing with those of the other belt throughout the parallel opposed portions thereof, and means for driving said belts so that the parallel opposed portions thereof will move in the same direction and at the same speed.

6. Mechanism for gripping and carrying grain stalks, comprising a pair of endless belts arranged side by side so that a portion of one belt is parallel and opposed to a portion of the other belt at all times, each of said belts comprising a broad band of woven fabric substantially rigid in directions parallel to the planes of its inner and outer faces, but flexible in directions perpendicular thereto, and longitudinally co-extensive continuous ribs of flexible woven fabric, the ribs of one belt being out of alinement with and intermeshing with those of the other belt throughout the parallel opposed portions thereof, and means for driving said belts so that the parallel opposed portions thereof will move in the same direction and at the same speed.

7. Mechanism for gripping and carrying grain stalks, comprising a pair of endless belts arranged side by side so that a portion of one belt is parallel and opposed to a portion of the other belt at all times, each of said belts comprising a broad band of woven fabric substantially rigid in directions parallel to the planes of its inner and outer faces, but flexible in directions perpendicular thereto, and longitudinally co-extensive continuous ribs of flexible woven fabric, and being integral with the main portions of the belt, the ribs of one belt being out of alinement with and intermeshing with those of the other belt throughout the parallel opposed portions thereof, and means for driving said belts so that the parallel opposed portions thereof will move in the same direction and at the same speed.

8. Mechanism for gripping and carrying grain stalks, comprising a pair of endless belts arranged side by side so that a portion of one belt is parallel and opposed to a portion of the other belt at all times, each of said belts comprising a broad band of woven non-stretching moisture-proof fabric substantially rigid in directions parallel to the planes of its inner and outer faces, but flexible in directions perpendicular thereto, and longitudinally co-extensive continuous ribs of flexible material, the ribs of one belt being out of alinement with and intermeshing with those of the other belt throughout the parallel opposed portions thereof, and means for driving said belts so that the parallel opposed portions thereof will move in the same direction and at the same speed.

9. Mechanism for gripping and carrying grain stalks comprising a pair of endless carriers having contiguous parallel opposed portions, one of said carriers comprising a band of flexible material provided with a plurality of longitudinal laterally separated ribs projecting from its exterior surface, said ribs being substantially co-extensive longitudinally with the belt, and the other carrier being provided with longitudinal laterally spaced portions out of alinement with and intermeshing with the longitudinal ribs of said band, and means for driving said carriers so as to cause the parallel opposed portions to move in the same direction and at the same speed.

10. Mechanism for gripping and carrying grain stalks comprising a pair of endless carriers having contiguous parallel opposed portions, one of said carriers comprising an endless belt of flexible material substantially inflexible in directions parallel to the planes of its inner and outer faces but flexible in directions transversely of said planes, and provided with a plurality of substantially continuous, longitudinally disposed and longitudinally co-extensive ribs, spaced apart transversely of said belt, and the other carrier being provided with endless substantially continuous longitudinally disposed spaced portions lying between and intermeshing with said ribs throughout the opposed parallel portions of said carriers, and means for driving said carriers so as to cause the parallel opposed portions to move in the same direction and at the same speed.

In testimony whereof I affix my signature.

LOUIS PREVOST WHITAKER.